(12) United States Patent
Nasirishargh

(10) Patent No.: US 12,131,136 B2
(45) Date of Patent: Oct. 29, 2024

(54) VIRTUAL KEYBOARD FOR WRITING PROGRAMMING CODES IN ELECTRONIC DEVICE

(71) Applicant: Aidin Nasirishargh, San Francisco, CA (US)

(72) Inventor: Aidin Nasirishargh, San Francisco, CA (US)

(*) Notice: Subject to any disclaimer, the term of this patent is extended or adjusted under 35 U.S.C. 154(b) by 86 days.

(21) Appl. No.: 17/719,267

(22) Filed: Apr. 12, 2022

(65) Prior Publication Data

US 2022/0236967 A1 Jul. 28, 2022

Related U.S. Application Data

(60) Provisional application No. 63/201,202, filed on Apr. 17, 2021.

(51) Int. Cl.
G06F 8/34 (2018.01)
G06F 3/0483 (2013.01)
G06F 3/04886 (2022.01)
G06F 16/90 (2019.01)

(52) U.S. Cl.
CPC .............. *G06F 8/34* (2013.01); *G06F 3/0483* (2013.01); *G06F 3/04886* (2013.01); *G06F 16/90* (2019.01)

(58) Field of Classification Search
None
See application file for complete search history.

(56) References Cited

U.S. PATENT DOCUMENTS

| 8,959,430 B1* | 2/2015 | Spivak | G06F 3/0482 715/272 |
| 10,248,282 B2 | 4/2019 | Sirpal et al. | |
| 10,275,042 B2* | 4/2019 | Kubota | H03M 11/06 |
| 10,929,008 B2 | 2/2021 | Isted et al. | |
| 2009/0183141 A1* | 7/2009 | Tai | G06F 11/3604 717/124 |
| 2010/0060585 A1* | 3/2010 | Chiu | G06F 3/04886 345/173 |
| 2010/0085313 A1* | 4/2010 | Rider | G06F 3/04886 345/173 |
| 2010/0194682 A1* | 8/2010 | Orr | G06F 3/04886 345/173 |
| 2010/0287486 A1* | 11/2010 | Coddington | G06F 3/0486 715/823 |
| 2011/0035209 A1* | 2/2011 | Macfarlane | G06F 3/0237 345/173 |

(Continued)

OTHER PUBLICATIONS

M. S. Bhatti et al., "Mistype resistant keyboard (NexKey)," 2018 13th Iberian Conference on Information Systems and Technologies (CISTI), Caceres, Spain, 2018, pp. 1-7, doi: 10.23919/CISTI.2018.8399230. (Year: 2018).*

*Primary Examiner* — Andrew M. Lyons
(74) *Attorney, Agent, or Firm* — NovoTechIP International PLLC

(57) ABSTRACT

Methods and systems machine learning-based methods and systems for facilitating a virtual keyboard for software coding on mobile computing devices. The present disclosure describes a code analysis platform that facilitates coding by enabling to user to program code on a mobile computing device by enabling a virtual keyboard that replaces the existing default keyboard when the user is required to type a software program.

23 Claims, 14 Drawing Sheets

(56) References Cited

U.S. PATENT DOCUMENTS

| | | | |
|---|---|---|---|
| 2013/0055138 A1* | 2/2013 | de Halleux | G06F 8/33 |
| | | | 715/773 |
| 2013/0120267 A1* | 5/2013 | Pasquero | G06F 3/04883 |
| | | | 345/168 |
| 2014/0306897 A1* | 10/2014 | Cueto | G06F 3/04886 |
| | | | 345/173 |
| 2015/0121283 A1* | 4/2015 | Kangas | G06F 3/0236 |
| | | | 715/773 |
| 2016/0098252 A1* | 4/2016 | Larsby | G06F 8/33 |
| | | | 717/113 |
| 2017/0147203 A1 | 5/2017 | Itoh | |
| 2019/0369849 A1* | 12/2019 | Gonzalez | G06T 1/20 |
| 2020/0042272 A1 | 2/2020 | de Paz et al. | |
| 2020/0097390 A1* | 3/2020 | Gunter | G06F 11/3684 |
| 2020/0117357 A1* | 4/2020 | Ye | G06F 3/0481 |
| 2021/0405977 A1* | 12/2021 | Baafi | G06F 3/0486 |

* cited by examiner

VIRTUAL KEYBOARD FOR WRITING PROGRAMMING CODES IN ELECTRONIC DEVICE

TECHNICAL FIELD

The present disclosure relates to a virtual on-screen keyboard (OS K) and, more particularly relates, to the virtual on-screen keyboard for electronic devices (e.g. smartphones, tablets, etc.) for programming.

BACKGROUND

Generally, software programs are typed and executed by users (e.g. software developers, students, etc.) on electronic devices like laptops, computers, and the like. Generally, a user types the programming code using a physical keyboard connected to the computers or laptops. Due to technological advancements, laptops and computers are provided with a virtual keyboard that can be used by the users to write and execute the software programs. Similarly, the software programs can be typed and executed on touch-enabled electronic devices (e.g. smartphones, tablets, etc.). In this scenario, the users rely on a default virtual keyboard rendered by an operating system of the electronic device. It is noted that the default virtual keyboard is mainly optimized for typing day-to-day texts and performing simpler actions on the touch-enabled electronic device. However, the software programs often deal with special characters (e.g. colon, semicolon, slash, mathematical and logical operators) frequently, which are uncommon in regular texts. Thus, the users have to switch between different tabs and/or pages with the default keyboard for searching the aforementioned characters. This makes it difficult for the users to type the software programs using the touch devices.

Therefore, there is a need for a customized virtual on-screen keyboard (OSK) for the touch devices for feasible and convenient typing of the software programs in addition to providing other technical advantages.

SUMMARY

Various embodiments disclose methods and systems for providing a virtual keyboard for typing program codes or software programs.

In an embodiment, a method comprising a code analysis platform incorporated in a server system is disclosed. The method includes receiving a user input from a user through a user device for initiating the virtual keyboard for typing software code. The method includes rendering the virtual keyboard for coding with a plurality of keys and at least a portion for an editor on a user interface of the user device, determining, at least one key selected by the user and performing the functionality associated with the key based on the user input. The virtual keyboard includes a first page and a second page, wherein the first page of the virtual keyboard comprises one or more number keys, alphabet keys, a shift key, a switch key, a first set of bracket keys, a space bar key, a first set of coding symbols, a return key and a delete key and the second page of the virtual keyboard comprises one or more uncommon symbol keys, logical operation keys, mathematical operation keys, an indent key, a select key, the switch key, a second set of bracket keys, the space bar key, a second set of coding symbols, the return key, the delete key, an outdent key, editing keys, a comment key and navigation keys.

In another embodiment, a server system is disclosed. The server system includes a memory configured to store instructions, and a processor configured to execute the instructions stored in the memory and thereby cause the server system to receive a user input from a user through a user device for initiating the virtual keyboard for typing software code, render the virtual keyboard for coding with a plurality of keys and at least a portion for an editor on a user interface of the user device, determine at least one key selected by the user and perform the functionality associated with the key based on the user input. The virtual keyboard includes a first page and a second page, wherein the first page of the virtual keyboard comprises one or more of: number keys, alphabet keys, a shift key, a switch key, a first set of bracket keys, a space bar key, a first set of coding symbols, a return key and a delete key and the second page of the virtual keyboard comprises one or more of: uncommon symbol keys, logical operation keys, mathematical operation keys, an indent key, a select key, the switch key, a second set of bracket keys, the space bar key, a second set of coding symbols, the return key, the delete key, an outdent key, editing keys, a comment key and navigation keys.

In yet another embodiment, a system is disclosed. The system includes a memory configured to store instructions, a communication interface and a processor in communication with the memory and the communication interface, the processor configured to execute the instructions stored in the memory and further comprising a rendering module configured to render a virtual keyboard with a plurality of virtual keys for software coding as an overlay to the default on-screen keyboard, a determination module configured to determine the key selected by a user, display the graphical symbol of the key in the editor platform and perform functionality associated with the key based on the user inputs on the virtual keyboard, a prediction module configured to provide suggestions and/or code snippets such as the auto-complete feature based on predicting the context and intent of the software code, and an error detection module configured to compile the typed software code for generating and displaying a list of errors on a user device.

BRIEF DESCRIPTION OF THE FIGURES

The following detailed description of illustrative embodiments is better understood when read in conjunction with the appended drawings. For the purpose of illustrating the present disclosure, exemplary constructions of the disclosure are shown in the drawings. However, the present disclosure is not limited to a specific device or a tool and instrumentalities disclosed herein. Moreover, those in the art will understand that the drawings are not to scale. Wherever possible, like elements have been indicated by identical numbers.

Figure 1:
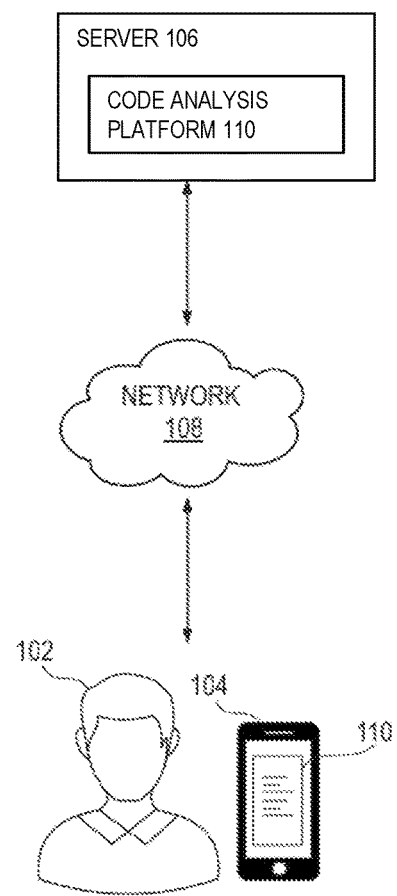
FIG. 1 is an example representation of an environment related to at least some example embodiments of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Reference in this specification to "one embodiment" or "an embodiment" means that a particular feature, structure, or characteristic described in connection with the embodiment is included in at least one embodiment of the present disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Various embodiments disclose methods and systems for providing virtual keyboard for typing program codes or software programs. The virtual keyboard is configured to provide easy navigation, access to common coding commands in a single tap, and text editing options for highlighting, moving and commenting on the code.

In various example embodiments, the present disclosure describes a code analysis platform that facilitates coding by enabling to user to program code on a mobile computing device by enabling a virtual keyboard that replaces the existing default keyboard when the user is required to type a software program. To use the code analysis platform to learn to code, the user may need to register first by providing user profile data on the code analysis platform. Upon registering with the code analysis platform, the user can use the code analysis platform to code using the virtual keyboard.

The present disclosure provides a server associated with the code analysis platform. The server activates the virtual keyboard for coding while running the application to replace the traditional keyboard layout and the server facilitates or displays an editor with the virtual keyboard required to type a software program on the code analysis platform.

In one embodiment, the server is configured to provide the virtual keyboard on the UI rendered on the user device based on user inputs for launching the application. The server replaces the default virtual keyboard of the device with the virtual keyboard for coding when the application is running. In one embodiment, the virtual keyboard for coding layout includes at least two pages, wherein each page comprises one or more keys represented with graphical symbols. The server is configured to display the graphical symbol of the key in the editor platform and perform functionality associated with the key based on the user inputs on the virtual keyboard. The server is configured to continuously track the software code in the editor platform for performing functionalities including but not limited to syntax highlighting, folding operations, text formatting, and the like. Further, the server is configured to provide suggestions and/or code snippets (i.e. auto-complete feature) based on predicting the context and intent of the software code. In an example embodiment, the server is configured to perform a compilation of the software code and provide errors in the software code to the user on the user device.

FIG. 1 is an illustration of an environment 100 related to at least some example embodiments of the present disclosure. Although the environment 100 is presented in one arrangement, other embodiments may include the parts of the environment 100 (or other parts) arranged otherwise depending on, for example, providing a virtual keyboard and editor for typing software code, etc. The environment 100 includes, but is not limited to a wireless communication network (e.g. a network 108) that connects entities such as a user 102 associated with a user device 104 and an application server 106.

The network 108 may include, without limitation, a light fidelity (Li-Fi) network, a local area network (LAN), a wide area network (WAN), a metropolitan area network (MAN), a satellite network, the Internet, a fiber-optic network, a coaxial cable network, an infrared (IR) network, a radio frequency (RF) network, a virtual network, and/or another suitable public and/or private network capable of supporting communication among the entities illustrated in FIG. 1, or any combination thereof.

Various entities in the environment 100 may connect to the network 108 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, or any combination thereof.

In one embodiment, the user 102 can access the code analysis platform 110 through a web browser or a mobile application installed on the user device 104. The code analysis platform 110 may present one or more User Interfaces (UIs) on a display screen of the electronic device 104 for facilitating typing of software code by the user 102.

In at least one example embodiment, the user 102 may access the code analysis platform 110 for providing user profile data to create a user profile for using the code analysis platform 110. The user profile data may include username, contact information, age, occupation, coding purpose, etc. The user 102 may also access the code analysis platform 110 for learning to code. In an embodiment, for facilitating code learning, the user signs-up access the code analysis platform 110, wherein the server 106 renders virtual keyboard for software coding in response to the initiation request received by the user 102. For example, the when the user accesses user interfaces for signing up or log-in to fill in the details such as the username, email, password etc., the server 106 is configured to display the traditional or default virtual keyboard to enter the details. Further, the code analysis platform 110 enables the user to switch between the traditional virtual keyboard and the virtual keyboard for coding by selecting the associated key or option. For example, the user can tap and select the option under the settings page to traverse between the default virtual keyboard and the virtual keyboard for coding.

In an embodiment, the server 106 may reside software backend APIs corresponding to the code analysis platform 110 which instructs the server 106 to perform one or more operations described herein. In addition, the server 106 should be understood to be embodied in at least one computing device in communication with the network 108, which may be specifically configured, via executable instructions, to perform as described herein, and/or embodied in at least one non-transitory computer-readable media.

The code analysis platform 110 is an application/tool resting at the server 106. In one embodiment, the server 106 is configured to host and manage the code analysis platform 110 and communicate with the electronic devices, such as the user device 104 for providing an instance of the code analysis platform 110.

In one embodiment, the server 106 is configured to provide the virtual keyboard on the UI rendered on the user device based on user inputs for launching the virtual keyboard for coding, wherein the server 106 replaces the default on-screen keyboard of the device with the virtual keyboard for coding. In at least one example embodiment, the height of the virtual keyboard of coding is designed as the height of the default on-screen keyboard displayed on the user device 104. The server 106 renders the virtual key board for coding with plurality of keys and at least a portion for an editor on a User Interface (UI) in an electronic device. The at least one portion of the editor displays at least one portion of software code typed by the user 102 using the virtual keyboard for coding. The server 106 then determines at least one key selected by the user, wherein the selection of the key comprises one or more of touch and drag, tap, swipe, slide and long press and performs the functionality associated with the key based on the user input.

In one embodiment, the virtual keyboard for coding layout includes at least two pages i.e. a first page and a second page, wherein each page comprises one or more keys represented with graphical symbols. The server 106 is configured to display the graphical symbol of the key in the editor platform and perform functionality associated with the key based on the user inputs on the virtual keyboard. The server 106 is configured to continuously track the software code in the editor platform for performing functionalities including but not limited to syntax highlighting, folding operations, text formatting, and the like. The server 106 is configured to enable the user to swipe across the keyboard in any of the four directions of up, right, down, or left resulting in the cursor moving in that direction in the editor. Further, the server 106 is configured to provide suggestions and/or code snippets (i.e. auto-complete feature) based on predicting the context and intent of the software code. In an example embodiment, the server 106 is configured to perform a compilation of the software code and provide errors in the software code to the user on the user device. The server 106 is further configured to enable editing of the typed code.

In one embodiment, the first page and the second page include various combinations of keys including but not limited to numeric keys, alphabetic character keys, function keys, a first set of coding keys, graphical keys and symbolic keys, enabled to receive a touch input or tapping on the key results from the user on the graphical symbol on the key to be inserted or the associated functionality to be performed. In one embodiment, the server 106 enables a user to tap-and-hold the keys to toggle between the first page and second page without changing or switching the page.

In at least one example embodiment, the first page of the virtual keyboard comprises of number keys, alphabet keys, a shift key, wherein the shift key enables the user to change the case of the characters (i.e. the alphabet keys), a switch key, wherein the switch key enables the user to switch between the first page and the second page, a first set of bracket keys, wherein the first set of bracket keys include opening brackets, a space bar key, a first set of coding symbols, a return key and a delete key.

The second page of the virtual keyboard includes keys such as but not limited to, uncommon symbol keys, wherein the uncommon symbol keys (such as "'", "@", "#", "$", "single quote", "~", "underscore", "`", "\", and "?"), logical operation keys (such as "!", "&", "|", "<", and ">"), an indent key, a select key, the switch key, a second set of bracket keys, the space bar key, a second set of coding symbols, the return key, the delete key, an outdent key, mathematical operation keys (such as "+", "−", "*", "/", and "%"), editing keys, a comment key and navigation keys. The select key enables to user to, the second set of bracket keys includes closing brackets and the second set of coding symbols (such as "double quote", "comma", and "colon").

The editing keys comprises at least an undo key, a find key, a redo key, a cut key, a copy key and a paste key.

The navigation keys include but are not limited to a home key, an up arrow key, an end key, a left arrow key, a down arrow key, and a right arrow key, the user 102 can move a cursor depicted in the editor platform by using the keys. Additionally, the user 102 can provide a swipe and/or gesture input on the virtual keyboard for moving the cursor in either of the four directions (e.g. up, down, left, and right) in the editor platform.

The comment key enables the user 102 to turn the selected part of the code into a comment or represent the source code in its original form. Furthermore, if the lines or the part of the code is already commented-out, providing input on the comment key turns it back to normal.

The indent key enables the user 102 to move the plurality of lines of code to the right of the cursor in the editor platform. The code or the lines to the left of the cursor can be moved to the left by providing input on the outdent key.

Based on user input (i.e. tap-and-hold input) on the outdent key a block of code may be folded in the editor platform. Alternatively, the unfold operation takes place by providing input (i.e. tapping) on the rectangular block.

Further, the server 106 is configured to provide auto-suggestion specific to a software code, wherein the user 102 is provided with a list of predefined options and/or code snippets. The list is provided to the user 102 based on predicting the context and the intent of the code on the editor. The pre-defined options may be stored in a database. The server 106 is configured to determine the context and intent of the code and display the list including the pre-defined options for enabling the user 102 to auto-complete the code by providing the input on any one option from the list. In one scenario, the user 102 may be rendered with the list upon typing a character and/or a command associated with a syntax. Further, the rendering of the virtual keyboard for receiving the user inputs is explained with reference to UIs shown in FIGS. 3A-3D to FIGS. 8A-8B.

Figure 3A:
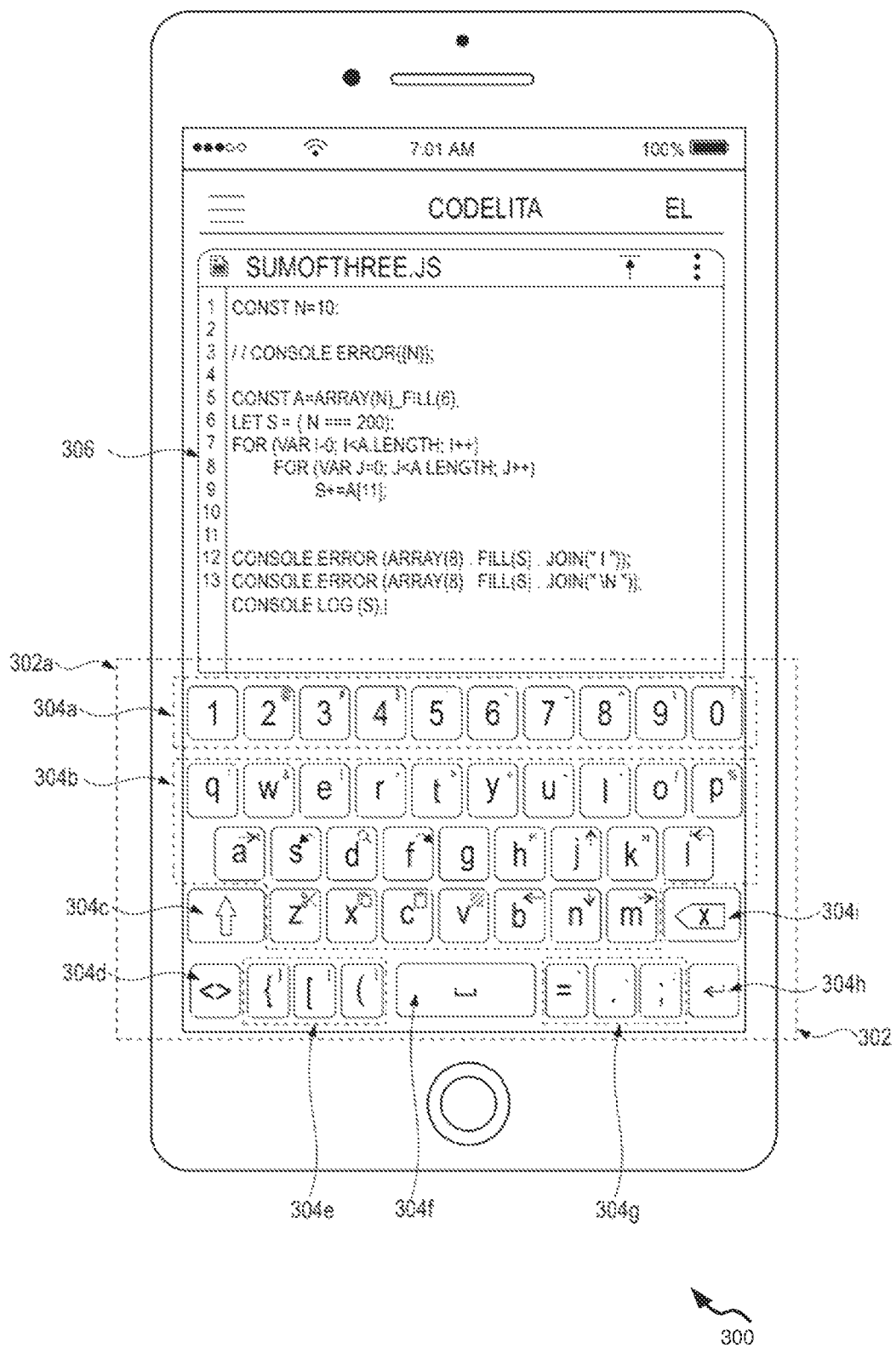
FIG. 3A illustrates an exemplary representation of a user interface (UI) displaying a first page of a virtual keyboard to a user, in accordance with an embodiment of the present disclosure.

In at least one example embodiment, the user device 104 may be equipped with an instance of an application, such as an application 110 installed therein. The application 110 provides an editor platform (i.e. a text input field) and a virtual keyboard (as shown in FIG. 3A). The user 102 (e.g., a programmer, a software developer, or a student) may provide inputs and/or type software programs on touch devices (i.e. the user device 104) by using the virtual keyboard provided by the application 110. The application 110 and its components may rest in an application server 106 and the user device 104. Examples of the user device 104 include a mobile phone, a smart telephone, a computer, a laptop, a PDA (Personal Digital Assistant), a Mobile Internet Device (MID), a tablet computer, an Ultra-Mobile personal computer (UMPC), a phablet computer, a handheld personal computer and the like.

The user 102 may provide feedback and/or a query related to the virtual keyboard or working of the application 110 to the application server 106 through the application 110 via the network 108. The application server 106 may resolve the query provided by the user 102. Further, the application server 106 may provide a notification to the user device 104 related to updates of the latest version of the application 110, thereby enabling the user 102 to download and install the latest version of the application 110 at the user device 104.

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally or alternatively, a set of systems (e.g., one or more systems) or a set of devices (e.g. one or more devices) of the environment 100 may perform one or more functions described as being performed by another set of systems or another set of devices of the environment 100.

Figure 2:
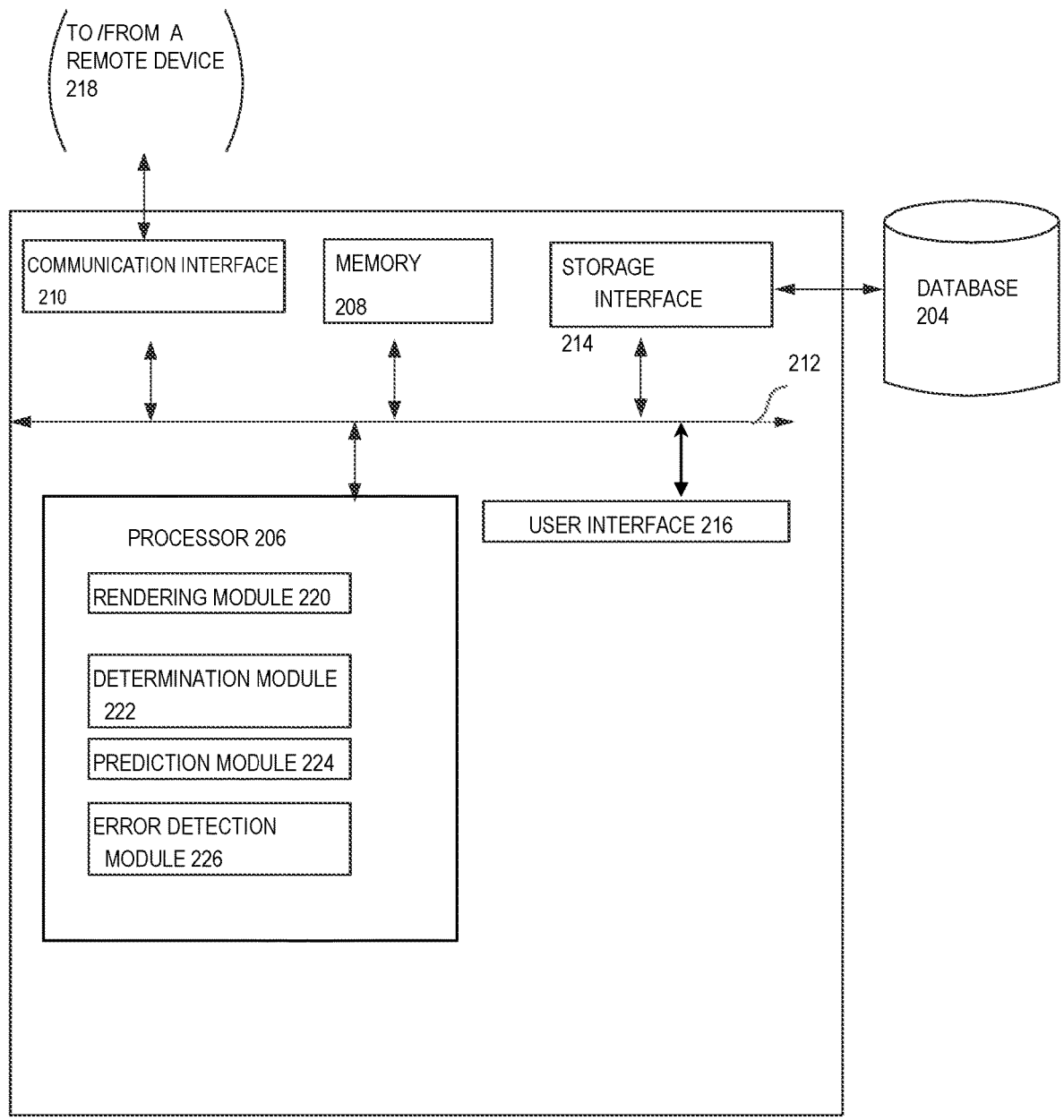
FIG. 2 is a block diagram representation of an electronic device, in accordance with an example embodiment of the present disclosure.

FIG. 2 is a block diagram of a server system 200, in accordance with an example embodiment. In some embodiments, the server system 200 is embodied as a cloud-based and/or SaaS-based (software as a service) architecture. The server system 200 is an example of the server 108 explained with reference to FIG. 1. The server system 200 is configured to render a virtual keyboard for software programming. In an embodiment, the server system 200 includes a computer system 202 and a database 204. The computer system 202 further includes at least one processor 206 for executing instructions, a memory 208, a communication interface 210, and a user interface 216 that communicate with each other via a bus 212.

In some embodiments, the database 204 is integrated within computer system 202. For example, the computer system 202 may include one or more hard disk drives as the database 204. A storage interface 214 is any component capable of providing the processor 206 with access to the database 204. The storage interface 214 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 206 with access to the database 204.

In one embodiment, the database 204 is configured to store profile data associated with each user of the one or more users, such as the user 102. The database 204 is also configured to predefined options and/or code snippets. Further, the database 204 is configured to store the complied errors with each coding program written by the user, such as the user 102.

The processor 206 includes suitable logic, circuitry, and/or interfaces to execute operations for receiving a request from a user (e.g. the user 102) for checking the submitted code. Examples of the processor 206 include, but are not limited to, an application-specific integrated circuit (ASIC) processor, a reduced instruction set computing (RISC) processor, a complex instruction set computing (CISC) processor, a field-programmable gate array (FPGA), and the like. The memory 208 includes suitable logic, circuitry, and/or interfaces to store a set of computer-readable instructions for performing operations. Examples of the memory 208 include a random-access memory (RAM), a read-only memory (ROM), a removable storage drive, a hard disk drive (HDD), and the like. It will be apparent to a person skilled in the art that the scope of the disclosure is not limited to realizing the memory 208, as described herein. In another embodiment, the memory 208 may be realized in the form of a database server or cloud storage, without departing from the scope of the present disclosure.

The processor 206 is operatively coupled to the communication interface 210 such that the processor 206 is capable of communicating with the remote device 218 such as the user device 102, or communicating with any entity connected to the network 106 (as shown in FIG. 1). Further, the processor 206 is operatively coupled to the user interface 216 for interacting with the user 102.

It is noted that the server system 200 as illustrated and hereinafter described is merely illustrative of an apparatus that could benefit from embodiments of the present disclosure and, therefore, should not be taken to limit the scope of the present disclosure. It is noted that the server system may include fewer or more components than those depicted in FIG. 2.

The processor 206 includes a rendering module 220, a determination module 222, a prediction module 224, and an error detection module 226. It should be noted that components, described herein, can be configured in a variety of ways, including electronic circuitries, digital arithmetic and logic blocks, and memory systems in combination with software, firmware, and embedded technologies.

In one embodiment, the processor 206 is configured to receive a request to imitate the virtual keyboard for software coding by the user 102 from user device 104.

The rendering module 220 includes suitable logic, circuitry, and/or interfaces to execute computer-readable instructions to render a virtual keyboard with a plurality of virtual keys for software coding as an overlay to the default on-screen keyboard, thereby replacing the default on-screen keyboard with the virtual keyboard and editor for coding. The rendering module 220, is further configured to render the different pages of the virtual layout (i.e. first page and second page) based on the user inputs received from the user 102.

The determination module 222 is in communication with the rendering module 220. The determination module 222 includes suitable logic, circuitry, and/or interfaces to execute computer-readable instructions for configured to determine the key selected by the user, display the graphical symbol of the key in the editor platform and perform functionality associated with the key based on the user inputs on the virtual keyboard. The determination module 222 is further configured to is configured to continuously track the software code in the editor platform for performing functionalities including but not limited to syntax highlighting, folding operations, text formatting, and the like.

The prediction module 224 is in communication with the determination module 222. The prediction module 224 includes suitable logic, circuitry, and/or interfaces to execute computer-readable instructions for providing suggestions and/or code snippets such as the auto-complete feature based on predicting the context and intent of the software code.

The error detection module 226 is in communication with the determination module 222. The error detection module 226 includes suitable logic, circuitry, and/or interfaces to execute computer-readable instructions for compiling the typed software code, generating a list of errors and displaying the list to the user 102 on the user device 104.

FIGS. 3A, 3B, 3C, and 3D represent example representations of user interfaces (UIs) displayed to the user for receiving user inputs from the user, in accordance with an embodiment of the present disclosure.

Referring to FIG. 3A, a representation of a UI 300 displayed to a user, such as the user 102 is shown in accordance with an embodiment of the present disclosure. The UI 300 is depicted to include a virtual keyboard 302. More specifically, a first page 302a of the virtual keyboard 302 is depicted in the UI 300 by replacing a default on-screen keyboard (OS K) as explained above. As shown in FIG. 3A, the virtual keyboard 302 is depicted at a bottom half of the UI 300 for receiving user inputs. In one scenario, based on the user inputs (e.g. a touch input) on an editor platform 306, the virtual keyboard 302 may be rendered on the UI 300. Further, providing the touch input on an area of the UI 300 that is not associated with the virtual keyboard 302 may dismiss the virtual keyboard 302.

The first page 302a of the UI 300 is depicted to include several keys represented with graphical symbols on it. More specifically, the first page 302a of the virtual keyboard 302 includes keys such as, but are not limited to, number keys 304a, alphabet keys 304b, a shift key 304c, a switch key 304d, a first set of bracket keys 304e, a space bar key 304f, a first set of coding symbols 304g, a return key 304h and a delete key 304i. The number keys 304a include numbers 1 to 9 followed by 0. The alphabet keys 304b include English alphabet characters arranged in form of a QWERTY layout. In one example embodiment, the alphabet keys 304b may be arranged in alphabetical order based on feasibility and requirement. The bracket keys 304e are exemplarily depicted to include open brackets (e.g., curly, square, and round). The symbols 304g are exemplarily depicted to include "equal sign", "dot" and "semicolon" that are common in coding. Thus, providing the touch input or tapping on the key results into the graphical symbol on the key to be inserted or the associated functionality to be performed in the UI 300.

Figure 3B:
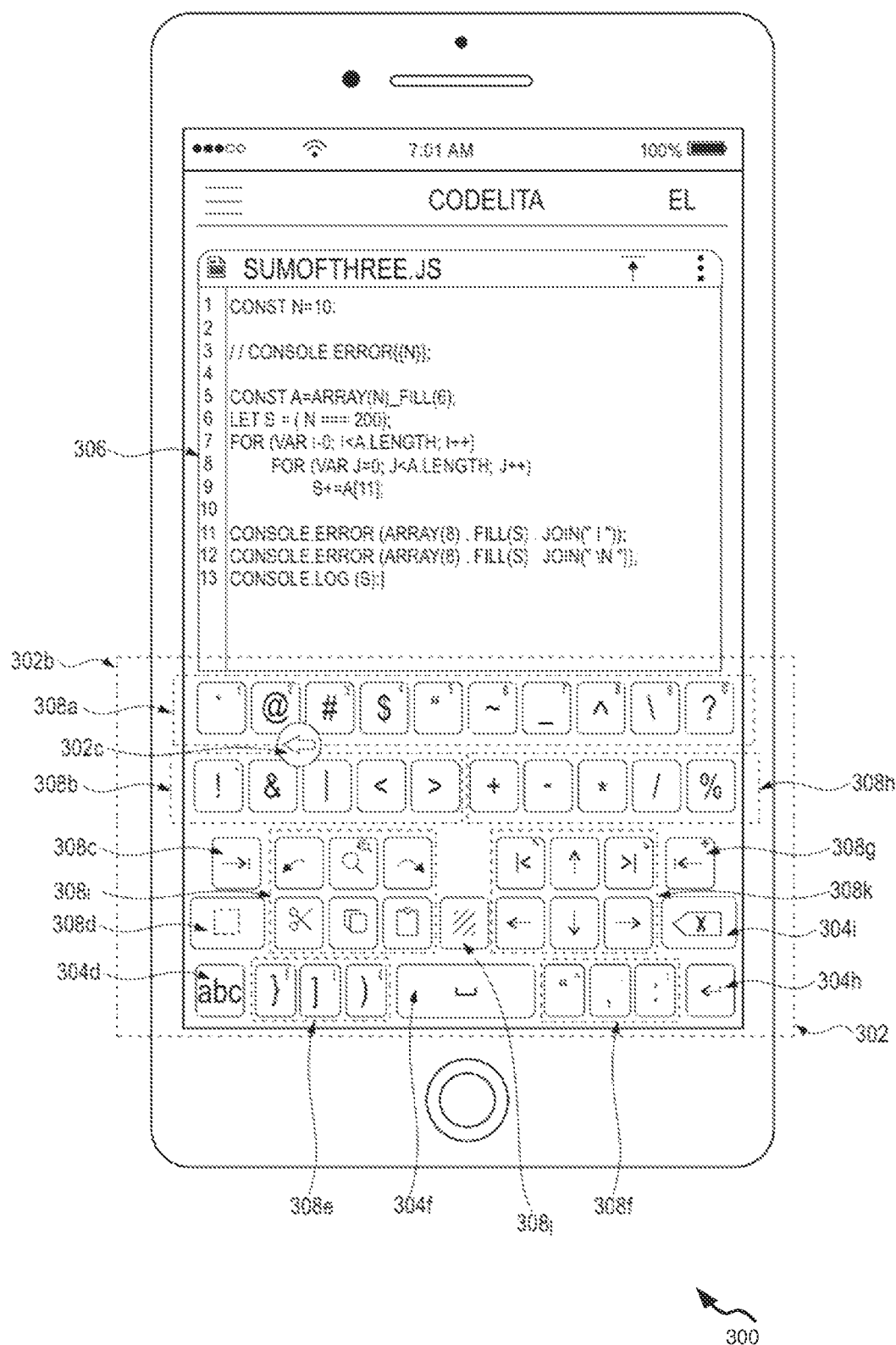
FIG. 3B illustrates an exemplary representation of the UI displaying a second page of the virtual keyboard to the user, in accordance with an embodiment of the present disclosure.
Figure 4:
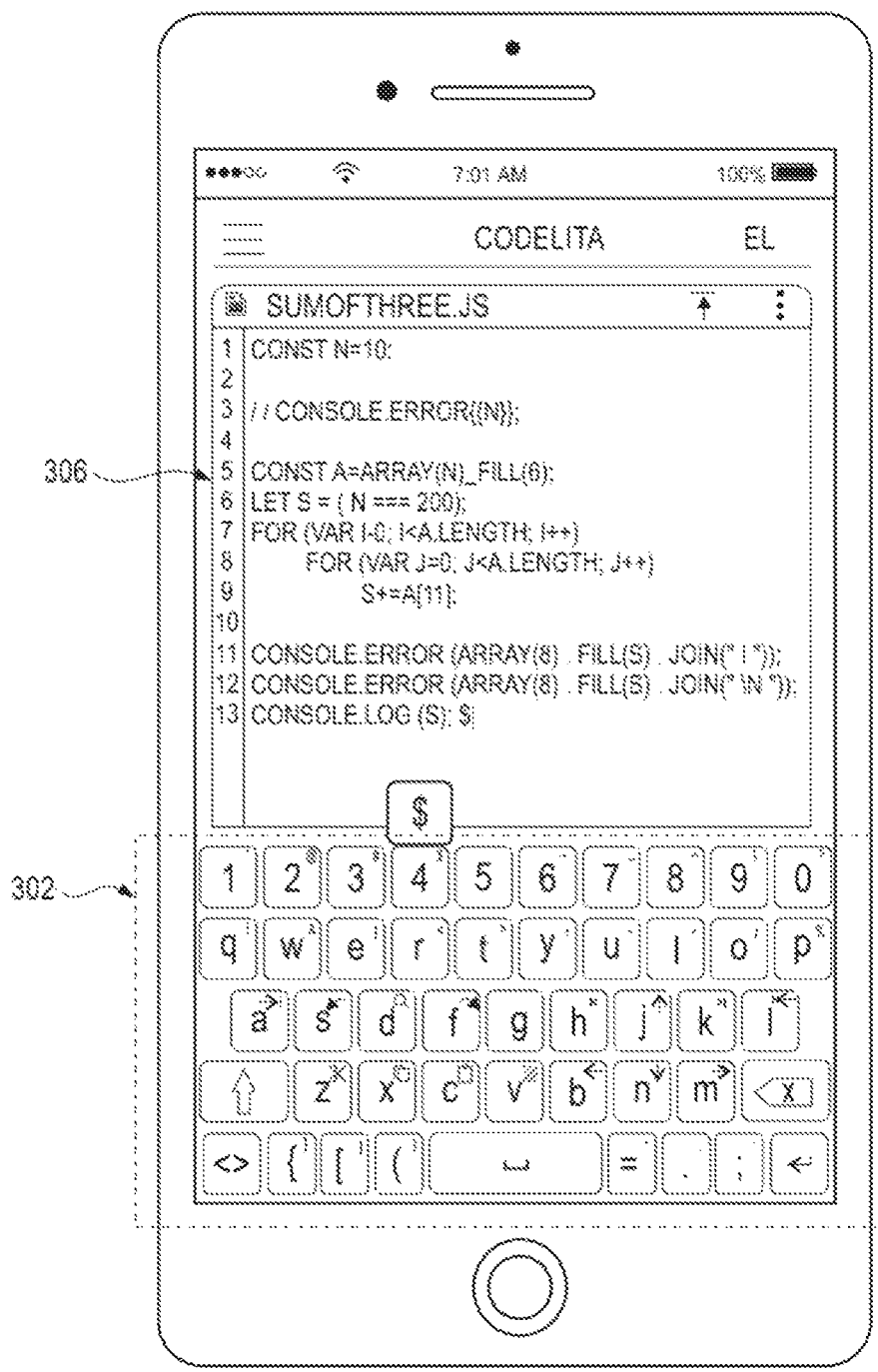
FIG. 4 illustrates an exemplary representation of the UI depicting a graphical symbol of a key of the virtual keyboard based on tap-and-hold input, in accordance with an embodiment of the present disclosure.

Further, the keys such as the number keys 304a, the alphabet keys 304b, the first set of bracket keys 304e, and the first set of coding symbols 304g are depicted to include additional graphical symbols (exemplarily depicted to be on the top right corner of each key). The graphical symbols represented on the aforementioned keys of the first page 302a are some keys depicted on a second page 302b of the virtual keyboard 302 (as shown in FIG. 3B). As such, the user 102 can tap-and-hold on certain keys on the first page 302a to type the character or perform the action specified by the graphical symbols without switching to the second page 302b. The duration of holding (or the Hold Duration) for providing inputs represented on the top right corner of certain keys may be of about 100 milliseconds to about 3 seconds. For instance, the user 102 may provide input on a number key associated with the graphical symbol "4" and the graphical symbol on the top right corner is "$" (as shown in FIG. 4). Based on a single tap on the number key, the number "4" is entered in the editor platform 306. Further, the user 102 can tap-and-hold on the number key "4" to enter the character "$" in the editor platform 306 (as shown in FIG. 4). Additionally, the selection of the graphical symbol at the top right corner may be indicated by visual animation (exemplarily depicted to be a pop-up of "$") in the virtual keyboard 302 (as shown in FIG. 4) when the user 102 taps and holds the number key "4".

The user 102 can change the characters (i.e. the alphabet keys 304b) to uppercase by providing a touch input (or a tap) on the shift key 304c. As such, the alphabet keys 304b are changed to uppercase for the duration of one key entered from the alphabet keys 304b. Further, the characters of the alphabet keys 304b remain in uppercase when the user 102 taps and holds the shift key 304c. The characters of the alphabet keys 304b remain in uppercase until the shift key 304c is tapped again by the user 102. Further, the user 102 may switch between the first page 302a and the second page 302b of the virtual keyboard 302 by providing input on the switch key 304d. It should be noted that the graphical symbol associated with the switch key 304d changes accordingly due to the shifting of the virtual keyboard 302 between the first page 302a and the second page 302b. For example, the graphical symbol associated with the switch key 304d is depicted to be a symbol on the first page 302a (as shown in FIG. 3A) and the graphical symbol of the switch key 304*d* is depicted to be alphabets on the second page 302*b* (as shown in FIG. 3B).

Further, the user 102 can insert a new line while writing the software code by providing input on the return key 304*h*. The new lines can be added continuously upon holding the return key 304*h* for a duration greater than the above-specified hold duration. Similarly, based on user input (tap) on the delete key 304*i*, a selected code or the character on the left side of the cursor is deleted. Further, upon holding the delete key 304*i* for a duration greater than the above-specified hold duration, the characters on the left side of the cursor are deleted continuously. Furthermore, the addition of new lines and deletion of the characters are stopped upon releasing the return key 304*h* and the delete key 304*i*, respectively.

Referring to FIG. 3B, the second page 302*b* of the virtual keyboard 302 is rendered on the UI 300 based on the user input on the switch key 304*d*. The second page 302*b* is depicted to include keys such as, but not limited to, uncommon symbol keys 308*a*, logical operation keys 308*b*, an indent key 308*c*, a select key 308*d*, the switch key 304*d*, a second set of bracket keys 308*e*, the space bar key 304*f*, a second set of coding symbols 308*f*, the return key 304*h*, the delete key 304*i*, an outdent key 308*g*, mathematical operation keys 308*h*, editing keys 308*i*, a comment key 308*j* and navigation keys 308*k*. The uncommon symbol keys 308*a* include graphic symbols that are exemplarily depicted to be """, "@", "#", "$", "single quote", "~", "underscore", "^", "\", and "?". The logical operation keys 308*b* include graphical symbols that are exemplarily depicted to be "!", "&", "|", "<", and ">". Further, the mathematical operation keys 308*h* include graphical symbols that are exemplarily depicted to be "+", "–", "*", "/", and "%". Furthermore, the second set of bracket keys 308*e* is exemplarily depicted to include closing brackets and the second set of coding symbols 308*f* include graphical symbols that are exemplarily depicted to be "double quote", "comma", and "colon".

Additionally, some keys depicted on the second page 302*b* include graphical symbols representing certain keys of the first page 302*a* at the top right corner (as shown in FIG. 3B). More specifically, the uncommon symbol keys 308*a*, the second set of bracket keys 308*e* and the second set of coding symbols 308*f* are depicted to include the graphical symbols of the number keys 304*a*, the first set of bracket keys 304*e* and the first set of coding symbols 304*g*, respectively. As such, the user 102 can tap-and-hold on the aforementioned keys on the second page 302*b* to type the character or perform the action associated with the graphical symbols without switching to the first page 302*a*.

Figure 3C:
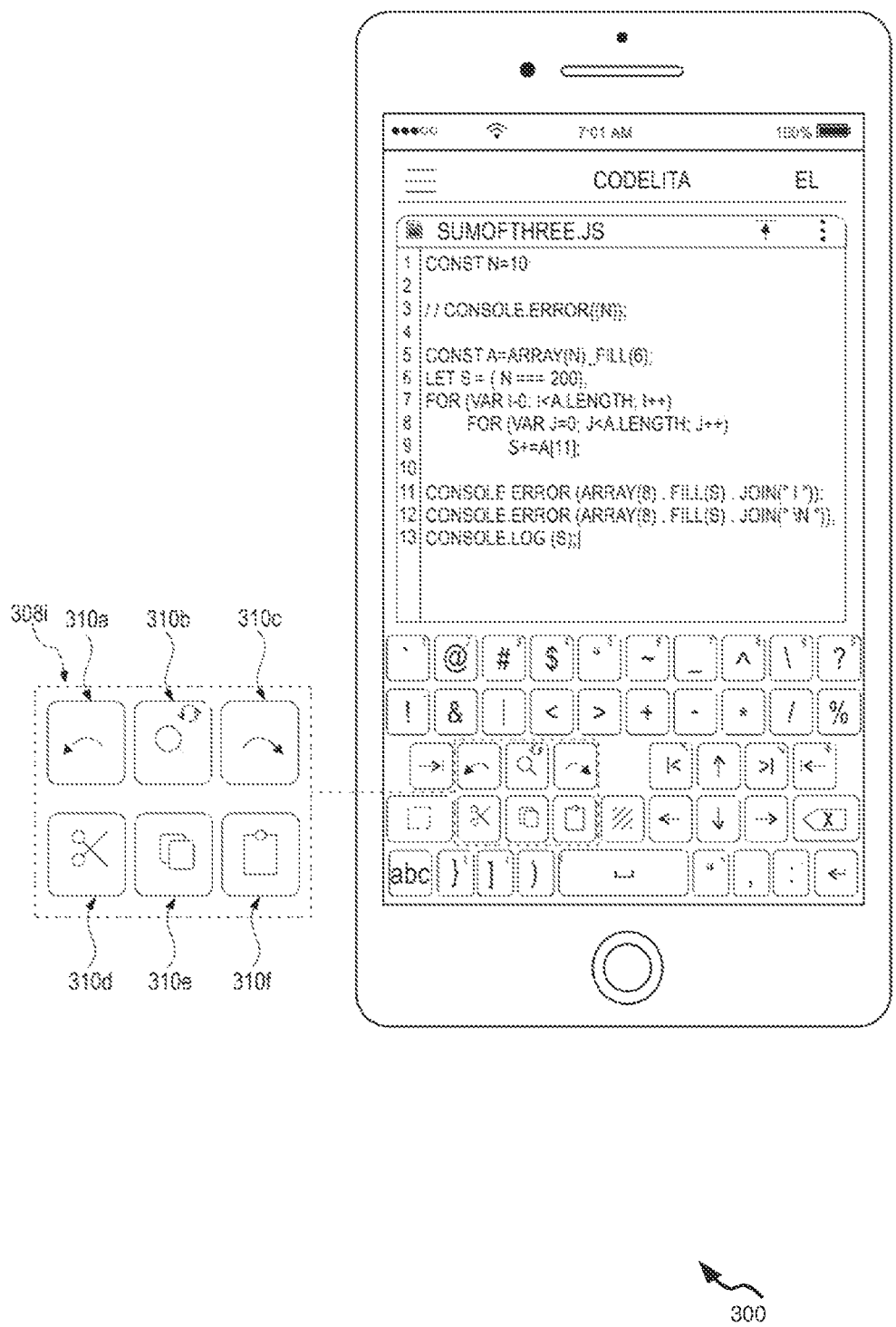
FIG. 3C illustrates an exemplary representation of the UI and a magnified view thereof depicting editing keys of the second page of the virtual keyboard, in accordance with an embodiment of the present disclosure.

The editing keys 308*i* include keys but are not limited to an undo key 310*a*, a find key 310*b*, a redo key 310*c*, a cut key 310*d*, a copy key 310*e* and a paste key 310*f* (as shown in FIG. 3C). The user 102 can undo or redo the last action (e.g., typed character, pasted code etc.) by providing input on the keys 310*a* and 310*c*, respectively. Further, the user 102 can search a typed character or code in the editor platform by providing input on the find key 310*b*. Upon providing input on the find key 310*b*, the user 102 may be rendered with a dialog box (not shown in Figures) to receive input related to the character or the code existing in the editor platform 306. Thereafter, the input provided in the dialog box may be highlighted in the editor platform 306 for the reference of the user 102. In other words, the user 102 can search the typed character in the editor platform 306 by providing input on the find key 310*b*. Additionally, the find key 310*b* is associated with a graphical symbol at the top right corner. The user 102 can provide tap-and-hold input on the find key 310*b* which renders the user 102 with a find-and-replace dialog box. The user 102 can provide an input (e.g., a typed character in the editor platform 306) and a new character that is to be replaced in place of the typed character in the code entered in the editor platform 306. This enables the user 102 to find and replace the character in the code entered in the editor platform 306. The functionalities associated with other keys of the editing keys 308*i* are explained further in detail.

Figure 3D:
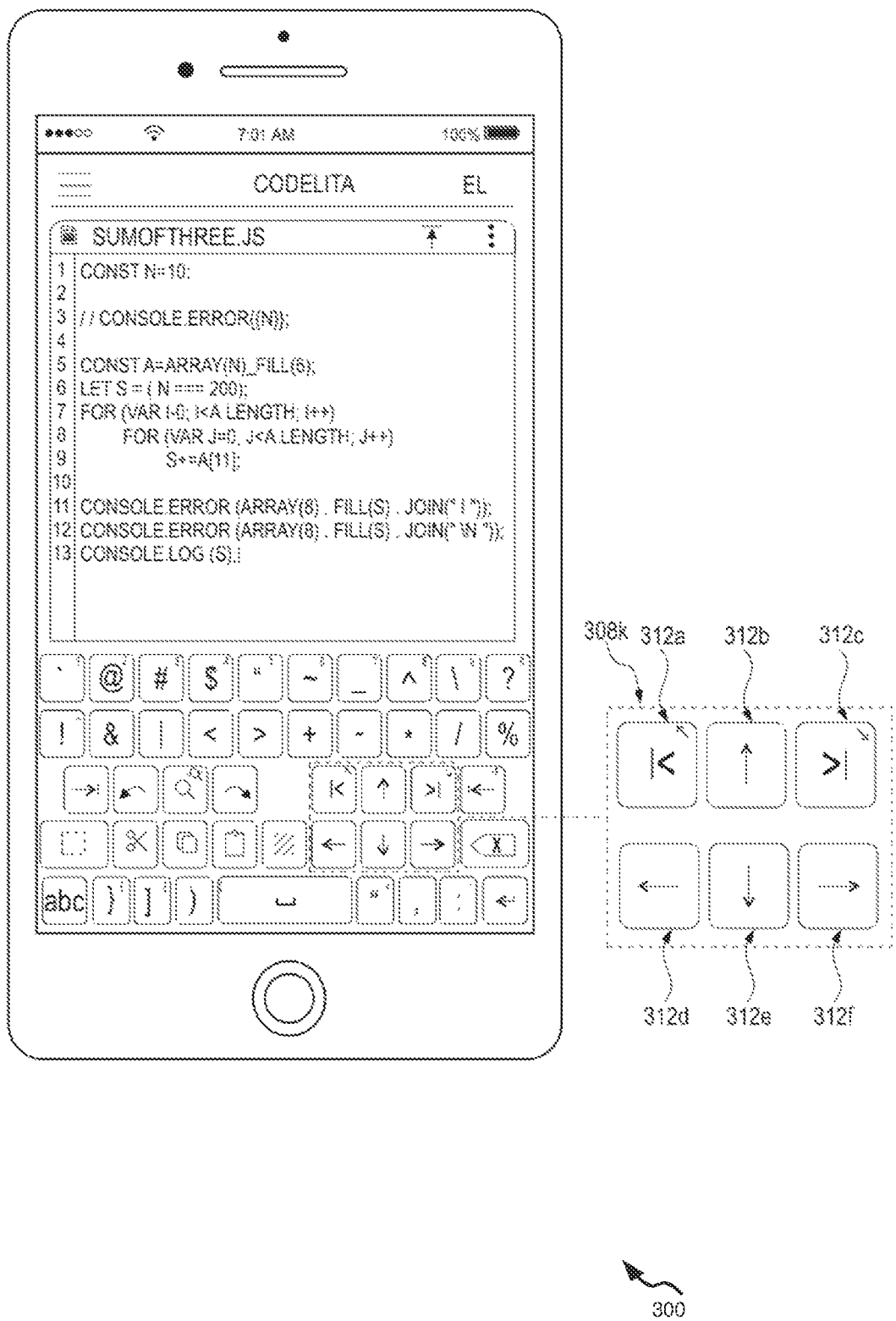
FIG. 3D illustrates an exemplary representation of the UI and a magnified view thereof depicting navigation keys of the second page of the virtual keyboard, in accordance with an embodiment of the present disclosure.

The navigation keys 308*k* include keys such as, but are not limited to a home key 312*a*, an up arrow key 312*b*, an end key 312*c*, a left arrow key 312*d*, a down arrow key 312*e*, and a right arrow key 312*f* (as shown in FIG. 3D). The user 102 can move a cursor depicted in the editor platform 306 by using the keys 312*b*, 312*d*, 312*e*, and 312*f*. Additionally, the user 102 can provide a swipe and/or gesture input on the virtual keyboard 302 for moving the cursor in either of the four directions (e.g., up, down, left, and right) in the editor platform 306. It should be noted that the swipe action should be relatively fast (e.g. less than or equal to 2 seconds). For instance, the user 102 may swipe left from the center of the virtual keyboard 302 for moving the cursor in the left direction. Moreover, visual animation feedback (see, 302*c* of FIG. 3B) indicating the direction of the swipe may be rendered on the UI 300. Further, the cursor can be moved to the end or beginning of a current line in the editor platform 306 by providing user input on the keys 312*a* and 312*b*, respectively. Additionally, the keys 312*a* and 312*b* are associated with a graphical symbol at the top right corner. Thus, providing input (i.e. tap-and-hold) on the home key 312*a* and the end key 312*c* facilitates the cursor to move to the initial point of the software code and the endpoint of the software code in the editor platform 306, respectively.

Figure 5:
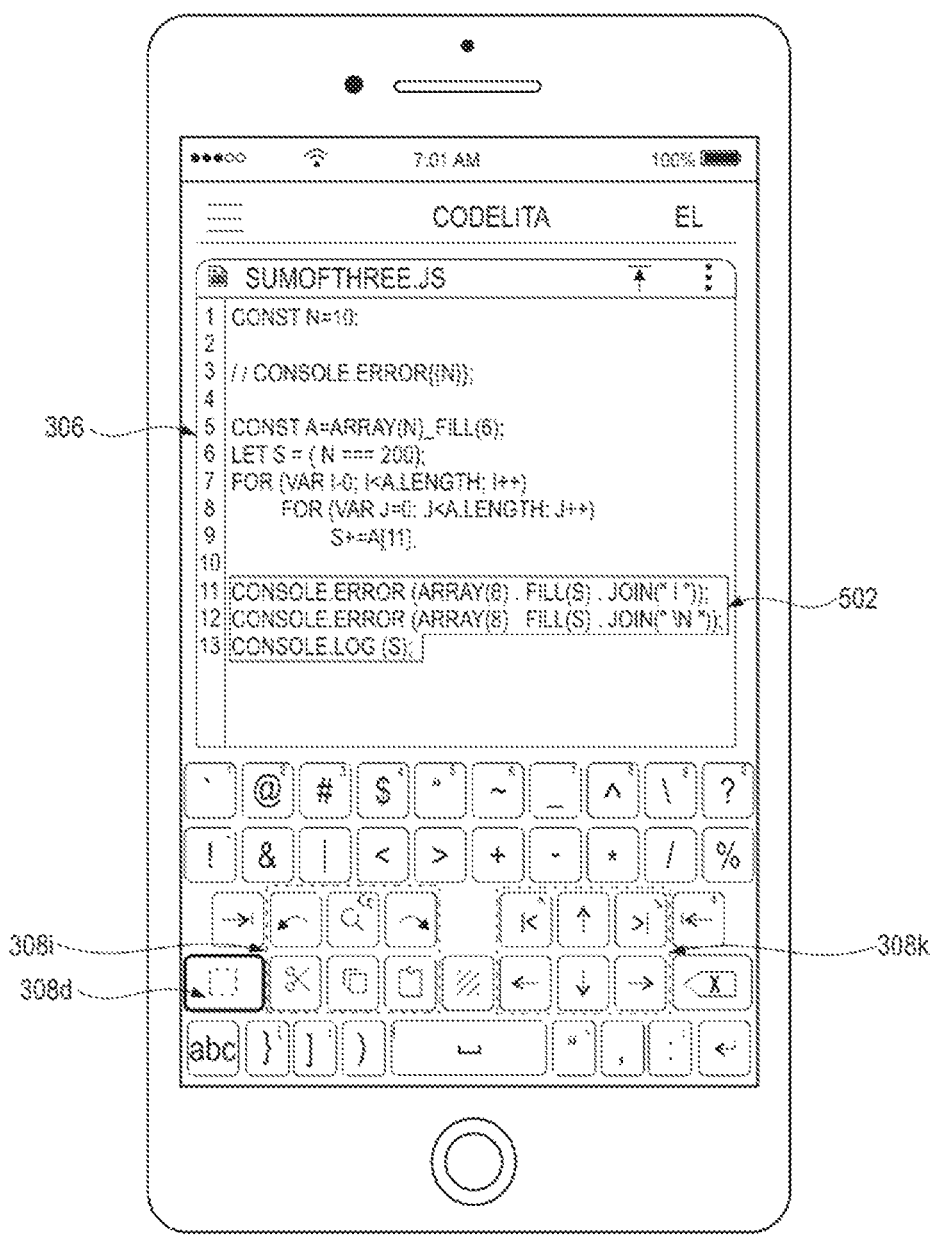
FIG. 5 illustrates an exemplary representation of the UI depicting selection of characters in a software code, in accordance with an embodiment of the present disclosure.

Referring to FIG. 5, one or more characters or lines of the software code entered in the editor platform 306 can be selected by using the virtual keyboard 302. More specifically, the user 102 can provide input on the select key 308*d* to initiate the selection of the desired code and/or lines in the editor platform 306. The select key 308*d* is exemplarily depicted as bold to indicate the selection of the key. Upon providing the input on the select key 308*d*, a current position of the cursor is marked as a beginning position of the selection. Further, the user 102 can provide input using the navigation keys 308*k* or provide gesture input on the virtual keyboard 302 to move the cursor to the desired selection area from the beginning position for selecting the characters or lines in the editor platform 306. The beginning position and the current position of the cursor may be selected and highlighted for depicting the selected characters. For illustrative purposes, the selected characters and/or code are enclosed by an area represented by solid lines for indicating the selection of the characters in UI 300 (see, 502 or lines 11 to 13 in the editor platform 306 of FIG. 5).

Additionally, the user 102 can remove the selected characters 502 (hereinafter interchangeably referred to as "selected code 502") by providing input on the delete key 304*i*. The user 102 can replace the selected characters 502 with a new character by providing input on the virtual keyboard 302 (i.e. typing the character using the virtual keyboard 302). Further, the selected code 502 can be replaced with a previously copied code by providing user input on the copy key 310*e*. Furthermore, the selected code 502 can be cut (i.e. a combination of copy and remove) and also copied into a clipboard of the device 200 by providing user input on the keys 310*d* and 310*f*, respectively. The lines of the code (either selected or unselected) to the right of the cursor can be moved in editor platform 306 (e.g., to the right by predefined indented spaces) by providing input on the indent key 308c. The indent of the lines can be continuous based on tap-and-hold input on the indent key 308c. The code or the lines to the left of the cursor can be moved to the left by providing input on the outdent key 308g. Further, a part of the software code (e.g., the code 502) can be rendered inert. To that effect, the user 102 can provide input on the comment key 308j for turning the selected part of the code into a comment or representing the source code in its original form. Furthermore, if the lines or the part of the code is already commented-out, providing input on the comment key 308j turns it back to normal.

Figure 6:
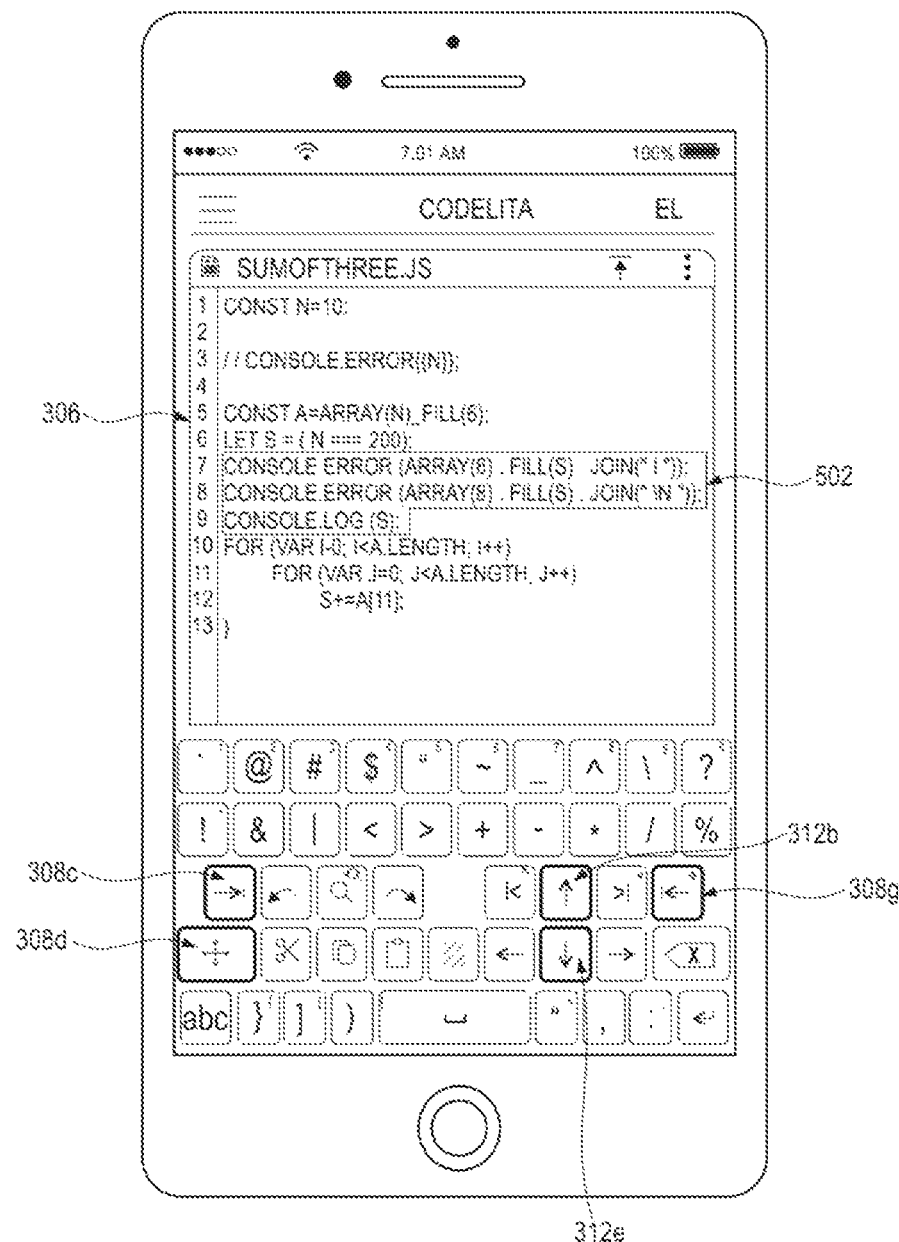
FIG. 6 illustrates an exemplary representation of the UI depicting moving of the selected characters in the software code, in accordance with an embodiment of the present disclosure.

Referring to FIG. 6 in conjunction with FIG. 5, the user 102 can move the selected code 502 by using the arrow keys 312b and 312e. More specifically, for initiating the moving operation, the user 102 may tap-and-hold the select key 308d. As shown in FIG. 6, the graphical symbol associated with the select key 308d changes for indicating the move operation in the UI 300. Thereafter, certain keys of the second page 302b such as the indent key 308c, the outdent key 308g, the arrow keys 312b and 312e are highlighted in the UI 300 for user's selection to perform the move operation. For illustrative purposes, the aforementioned keys on the second page 302b are exemplarily highlighted as bold based on user input (i.e. the tap-and-hold input) on the select key 308d. The user 102 can use the aforementioned highlighted keys (i.e. the keys 308c, 308g, 312b, and 312e) for performing the move operation. For instance, the lines 11 to 13 including a part of the selected code 502 are selected as explained above. The lines 11 to 13 are moved up by 4 lines based on providing the user input four times on the up arrow key 312b. In other words, the lines 11 to 13 are moved above the lines 7, 8 and 9, respectively, by tapping on the key 312b four times by the user 102. It should be noted that the selected lines are moved based on the number of inputs on the up arrow key 312b. In one scenario, the user 102 may provide gesture input (i.e. swiping in the upward or downward direction) on the virtual keyboard 302 for moving the selected code in the specified direction on the editor platform 306.

Figure 7:
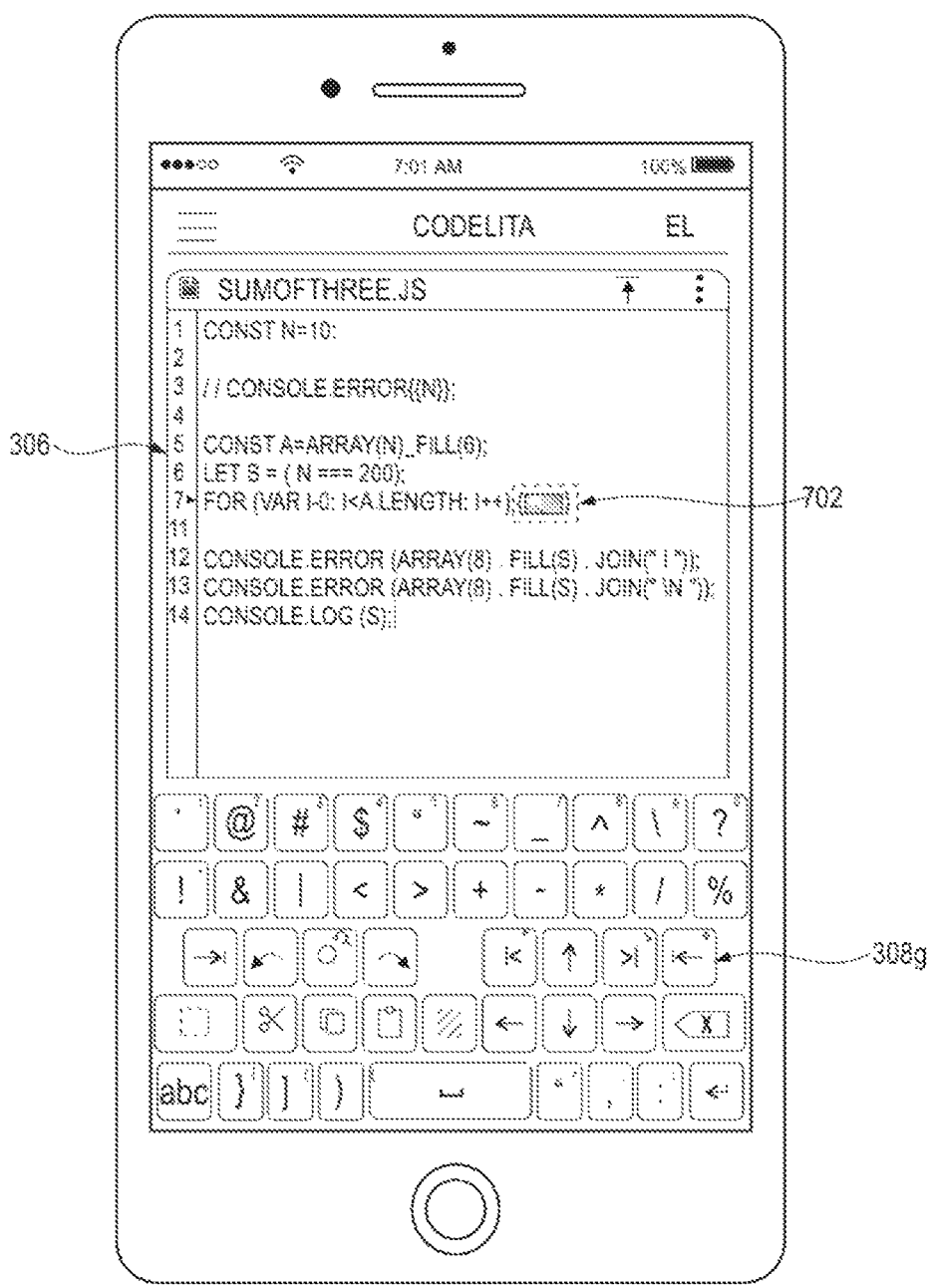
FIG. 7 illustrates an exemplary representation of the UI depicting folding of a block code, in accordance with an embodiment of the present disclosure.

Referring now to FIG. 7 in conjunction with FIG. 5, a part of the block code can be folded by providing user input on the outdent key 308g. More specifically, the outdent key 308g is depicted to include a graphical symbol at the top right corner that is associated with fold operation. Based on user input (i.e. tap-and-hold input) on the outdent key 308g, the block code may be folded in the editor platform 306. For instance, the cursor in the editor platform 306 may be present in a code block (i.e. between lines 7 to 10). In this scenario, the block code in the lines 7 to 10 will be folded, upon providing the user input (i.e. tap-and-hold) on the outdent key 308g. Typically, the block code in the lines 7 to 10 is compressed by the processor 202 of the device 200 based on the user input on the outdent key 308g. In other words, a section of the code (i.e. the block code) is combined in a systematic way. For illustrative purposes, the compressed block code is exemplarily depicted as a rectangular block 702 in line 7 to indicate the fold of the block code (i.e. the fold operation). In this scenario, the lines 8 to 10 are folded and the line after the line 7 in the editor platform 306 starts from the line 11 (as shown in FIG. 7). Moreover, the folded code may be unfolded or reverted to normal by providing the input (tap) on the outdent key 308g. Alternatively, the unfold operation takes place by providing input (i.e. tapping) on the rectangular block 702.

Figure 8A:
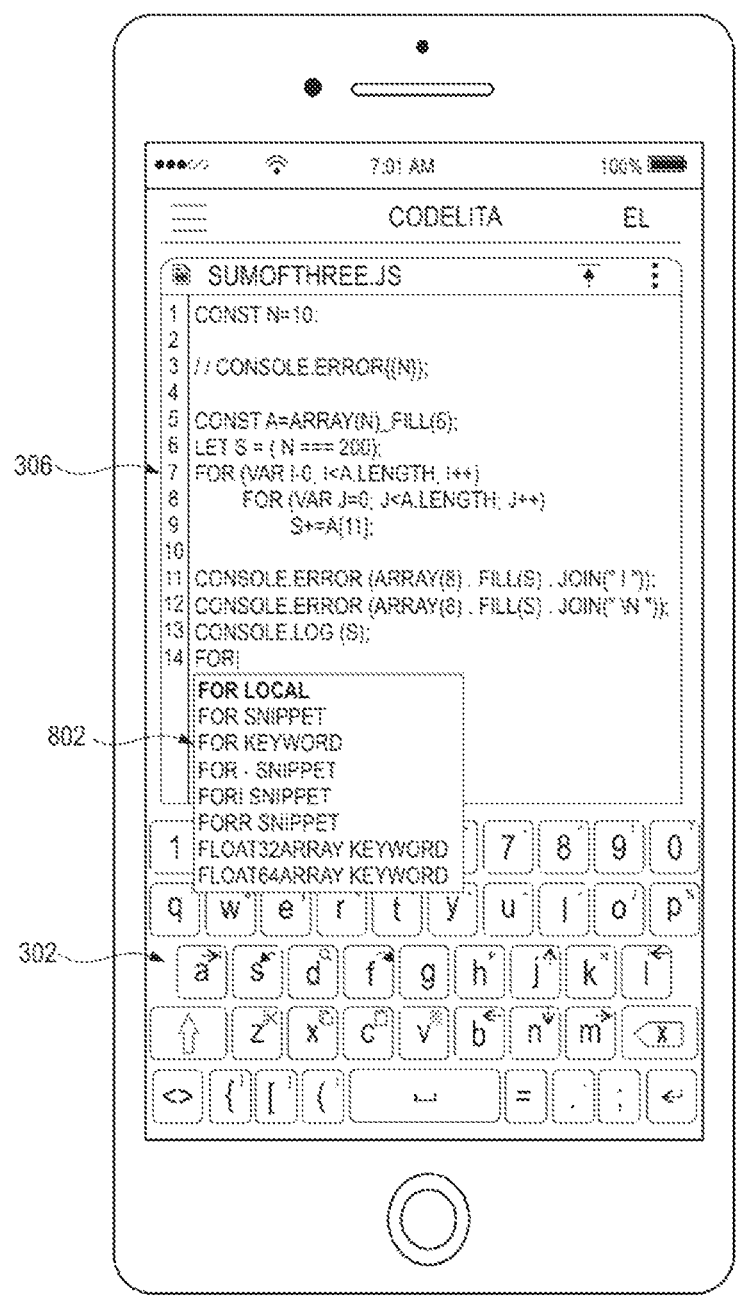
FIG. 8A illustrates an exemplary representation of the UI displaying a list of predefined options for the user selection, in accordance with an embodiment of the present disclosure.
Figure 8B:
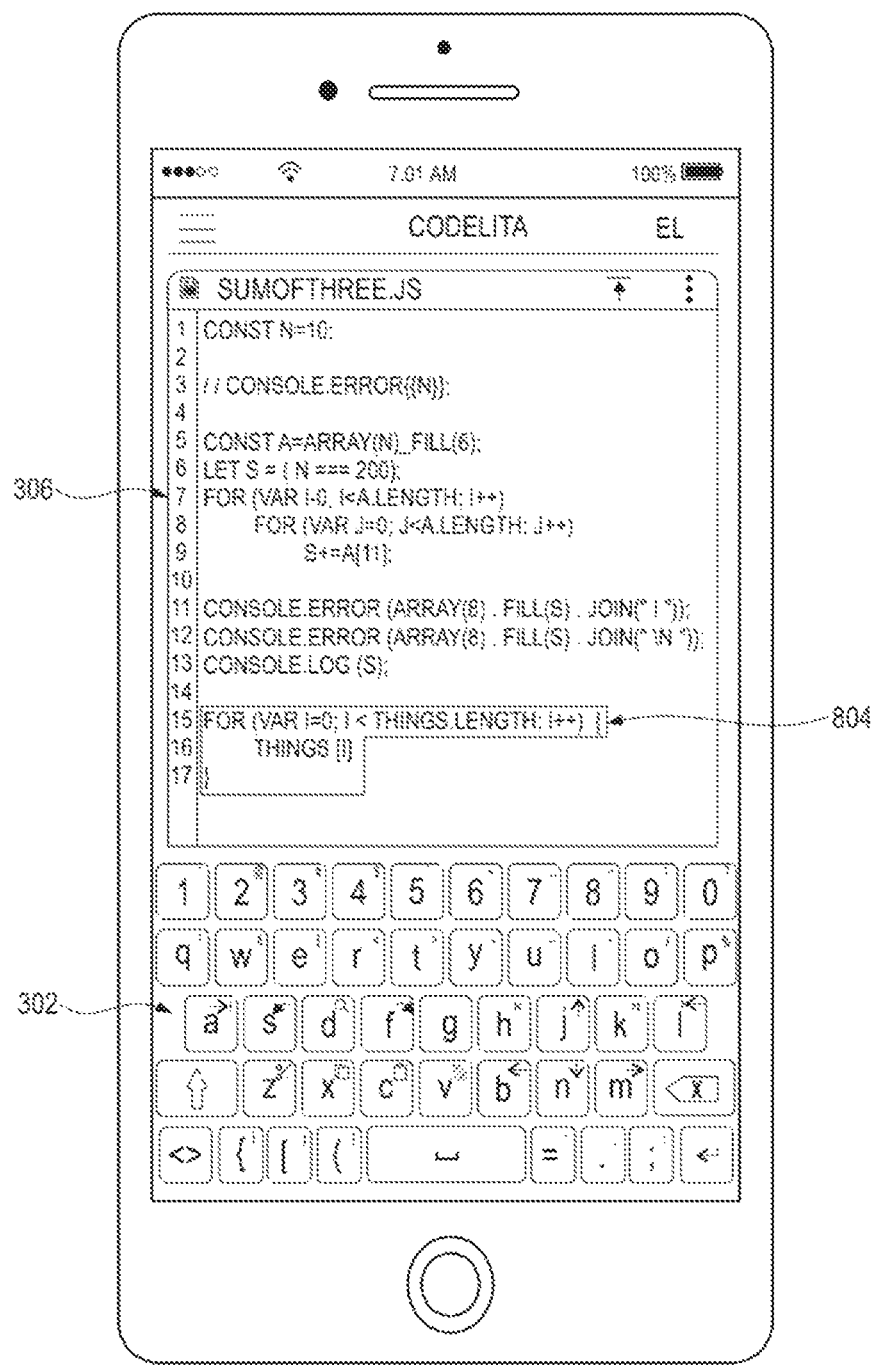
FIG. 8B illustrates an exemplary representation of the UI displaying insertion of an option selected from the list of predefined options based on the user selection, in accordance with an embodiment of the present disclosure.

Referring now to FIGS. 8A and 8B, the user 102 is provided with a list 802. The list 802 includes predefined options and/or code snippets. The list 802 is provided to the user 102 based on predicting the context and the intent of the code in the editor platform 306. The predefined options may be stored in a database (e.g., the storage module 210). The processor 202 with access to the storage module 210, may be configured to determine the context and intent of the code and display the list 802 including the predefined options for enabling the user 102 to auto-complete the code by providing the input on any one option from the list 802. In one scenario, the user 102 may be rendered with the list 802 upon typing a character and/or a command associated with a syntax. For example, the list 802 depicting the predefined options is suggested for the typed character and/or the command (exemplarily depicted to be "for") is shown in FIG. 8A. The user 102 may provide the gesture input (i.e. swiping up and down) on the virtual keyboard 302 for transitioning between the options of the list 802. In one case, the user 102 can use the navigation keys 308k for transitioning between the options of the list 802. In another case, the user 102 may provide gesture inputs within the list for transitioning between the options provided in the list 802.

Further, the option and/or a code snippet from the list 802 is selected and inserted (e.g., a code 804 associated with the selected snippet "for local" is selected and inserted) in the editor platform 306 by swiping to right in the virtual keyboard 302 (as shown in FIG. 8B). In other words, the user 102 can auto-complete the code associated with the "for command" by selecting the option and/or the code snippet from the list 802 by providing the gesture input. Additionally, providing input on the return key 304h may accept a code snippet selected in the list 802 and insert the code associated with the selected snippet in the editor platform 306. In another embodiment, the user 102 can use the indent key 308c for accepting the selected snippet as explained above.

Figure 9:
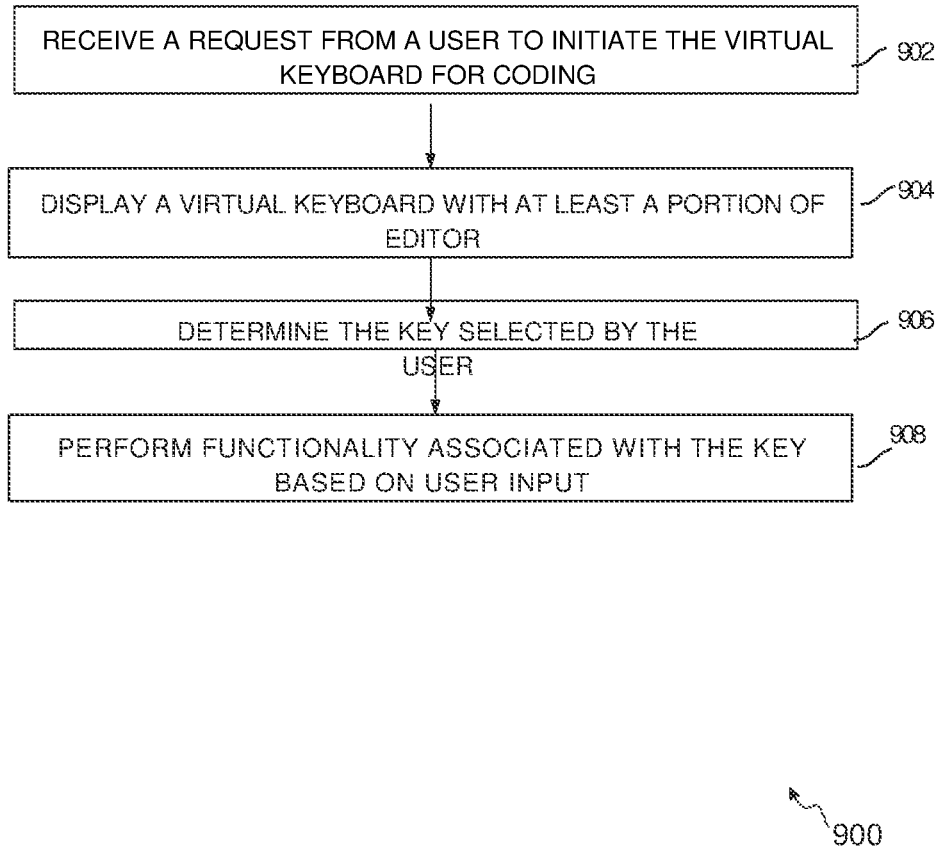
FIG. 9 is a flow diagram of steps performed by the code analysis platform that facilitates a virtual keyboard for software programming, in accordance with an example embodiment.

FIG. 9 is a flowchart illustrating a method 900 for providing a virtual keyboard for typing software code to users, in accordance with an example embodiment. The operations of the method 900 may be carried out by a server such as the server system 106, the system 200 or the electronic device 104. The sequence of operations of the method 900 may not be necessarily executed in the same order as they are presented. Further, one or more operations may be grouped together and performed in form of a single step, or one operation may have several sub-steps that may be performed in parallel or in a sequential manner.

At operation 902, the method 900 includes receiving a user input from at least one user (such as user 102) for initiating the virtual keyboard for typing software code.

At operation 904, the method includes rendering the virtual keyboard for coding with a plurality of keys and at least a portion for an editor on a User Interface (UI) in an electronic device. The at least one portion of the editor displays a portion of software code typed by the user using the virtual keyboard for coding.

At operation 906, the method 900 includes determining at least one key selected by the user, wherein the selection of the key comprises one or more of touch and drag, tap, swipe, slide and long press.

At operation 908, the method 900 includes performing the functionality associated with the key based on the user input.

Figure 10:
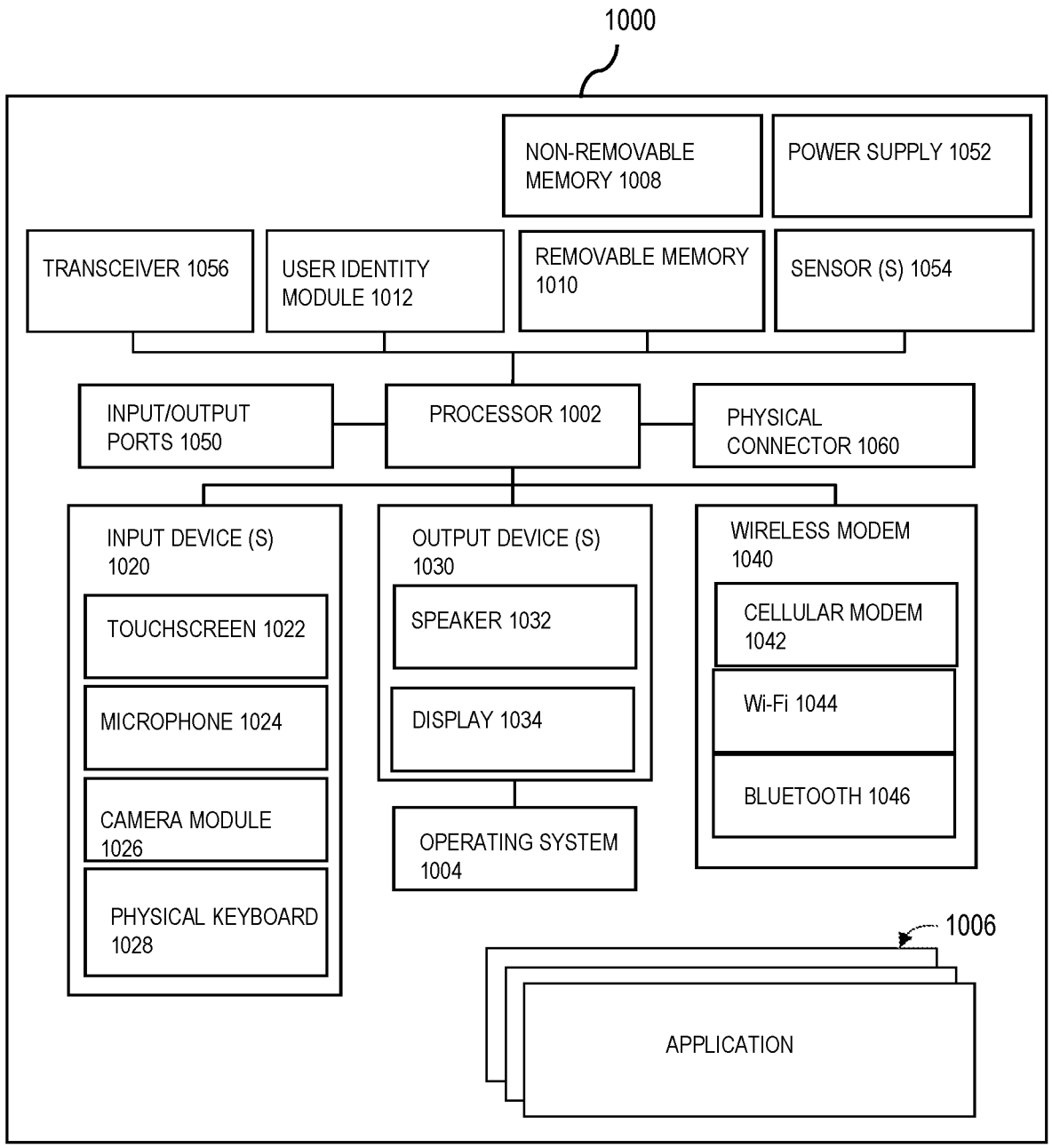
FIG. 10 is a simplified block diagram of an electronic device capable of implementing the various embodiments of the present disclosure.

FIG. 10 shows a simplified block diagram of an electronic device 1000 capable of implementing the various embodiments of the present disclosure. The electronic device 1000 may be an example of the user device 104. It should be understood that the electronic device 1000 as illustrated and hereinafter described is merely illustrative of one type of device and should not be taken to limit the scope of the embodiments. As such, it should be appreciated that at least some of the components described below in connection with the electronic device 1000 may be optional and thus in an example embodiment may include more, less, or different components than those described in connection with the example embodiment of the FIG. 10. As such, among other examples, the electronic device 1000 could be any of an electronic device or may be embodied in any of the electronic devices, for example, cellular phones, tablet computers, laptops, mobile computers, personal digital assistants (PDAs), mobile televisions, mobile digital assistants, or any combination of the aforementioned, and other types of communication or multimedia devices.

The illustrated electronic device 1000 includes a controller or a processor 1002 (e.g., a signal processor, microprocessor, ASIC, or other control and processing logic circuitry) for performing such tasks as signal coding, data processing, image processing, input/output processing, power control, and/or other functions. An operating system 1004 controls the allocation and usage of the components of the electronic device 1000 and provides support for one or more programs such as a code analysis platform that implements one or more of the innovative features described herein. The electronic device 1000 is depicted to include one or more applications such as the code analysis platform 110 facilitated by the server system 200/the server 106. The code analysis platform 1006 can be an instance of an application downloaded from the server system 200/the server 106 or a third-party server. The code analysis platform 1006 is capable of communicating with the server system 200/the server 106 for sending codes submitted by a user (e.g., user 102) and receiving feedbacks from the server system 200/the server 106. The applications may further include common mobile computing applications (e.g., telephony applications, email applications, calendars, contact managers, web browsers, messaging applications such as USSD messaging or SMS messaging or SIM Tool Kit (STK) application) or any other computing application.

The illustrated electronic device 1000 includes one or more memory components, for example, a non-removable memory 1008 and/or a removable memory 1010. The non-removable memory 1008 and/or the removable memory 1010 may be collectively known as storage device/module in an embodiment. The non-removable memory 1008 can include RAM, ROM, flash memory, a hard disk, or other well-known memory storage technologies. The removable memory 1010 can include flash memory, smart cards, or a Subscriber Identity Module (SIM). The one or more memory components can be used for storing data and/or code for running the operating system 1004. The electronic device 1000 may further include a user identity module (UIM) 1012. The UIM 1012 may be a memory device having a processor built-in. The UIM 1012 may include, for example, a subscriber identity module (SIM), a universal integrated circuit card (UICC), a universal subscriber identity module (USIM), a removable user identity module (R-UIM), or any other smart card. The UIM 1012 typically stores information elements related to a mobile subscriber. The UIM 1012 in form of the SIM card is well known in Global System for Mobile (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The electronic device 1000 can support one or more input devices 1020 and one or more output devices 1030. Examples of the input devices 1020 may include, but are not limited to, a touch screen/a display screen 1022 (e.g., capable of capturing finger tap inputs, finger gesture inputs, multi-finger tap inputs, multi-finger gesture inputs, or keystroke inputs from a virtual keyboard or keypad), a microphone 1024 (e.g., capable of capturing voice input), a camera module 1026 (e.g. capable of capturing still picture images and/or video images) and a physical keyboard 1028. Examples of the output devices 1030 may include, but are not limited, to a speaker 1032 and a display 1034. Other possible output devices can include piezoelectric or other haptic output devices. Some devices can serve more than one input/output function. For example, the touch screen 1022 and the display 1034 can be combined into a single input/output device.

A wireless modem 1040 can be coupled to one or more antennas (not shown in the FIG. 10) and can support two-way communications between the processor 1002 and external devices, as is well understood in the art. The wireless modem 1040 is shown generically and can include, for example, a cellular modem 1042 for communicating at long range with the mobile communication network, a Wi-Fi compatible modem 1044 for communicating at short range with an external Bluetooth-equipped device or a local wireless data network or router, and/or a Bluetooth-compatible modem 1046. The wireless modem 1040 is typically configured for communication with one or more cellular networks, such as a GSM network for data and voice communications within a single cellular network, between cellular networks, or between the electronic device 1000 and a public switched telephone network (PSTN).

The electronic device 1000 can further include one or more input/output ports 1050, a power supply 1052, one or more sensors 1054 for example, an accelerometer, a gyroscope, a compass, a global positioning system sensor (for providing location details) or an infrared proximity sensor for detecting the orientation or motion of the electronic device 1000, a transceiver 1056 (for wirelessly transmitting analog or digital signals) and/or a physical connector 1060, which can be a USB port, IEEE 1294 (FireWire) port, and/or RS-232 port. The illustrated components are not required or all-inclusive, as any of the components shown can be deleted and other components can be added.

The present disclosure is described above with reference to block diagrams and flowchart illustrations of method and system embodying the present disclosure. It will be understood that various blocks of the block diagram and flowchart illustrations, and combinations of blocks in the block diagrams and flowchart illustrations, respectively, may be implemented by a set of computer program instructions. These set of instructions may be loaded onto a general-purpose computer, special-purpose computer, or other programmable data processing apparatus to cause a device, such that the set of instructions when executed on the computer or other programmable data processing apparatus create a means for implementing the functions specified in the flowchart block or blocks. Although other means for implementing the functions including various combinations of hardware, firmware, and software as described herein may also be employed.

Various embodiments described above may be implemented in software, hardware, application logic, or a combination of software, hardware, and application logic. The software, application logic, and/or hardware may reside on at least one memory, at least one processor, an apparatus or, a non-transitory computer program product. In an example embodiment, the application logic, software, or an instruction set is maintained on any one of various conventional computer-readable media. In the context of this document, a "computer-readable medium" may be any non-transitory media or means that can contain, store, communicate, propagate or transport the instructions for use by or in connection with an instruction execution system, apparatus, or device, such as a computer. A computer-readable medium may comprise a computer-readable storage medium that may be any media or means that can contain or store the instructions for use by or in connection with an instruction execution system, apparatus, or device, such as a computer.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the invention.

What is claimed is:

1. A computer-implemented method comprising a code analysis platform incorporated in a server system configured to perform steps of:
    receiving, by a server system, a user input from a user through a user device for initiating a virtual keyboard for typing software code;
    rendering, by the server system, the virtual keyboard for coding with a plurality of keys and at least a portion for an editor platform on a user interface of the user device, wherein the virtual keyboard includes a first page and a second page, wherein the first page comprises a first switch key configured to switch the virtual keyboard from the first page to the second page in response to the user pressing the first switch key and a first set of keys and each of the first set of keys have a first graphic symbol and at least one first additional graphic symbol, wherein the at least one first additional graphic symbol represents a key from a second set of keys of the second page, and wherein the first set of keys are tap-and-hold keys which are each configured to type a character corresponding to the first graphic symbol from the first set of keys when the key is held for less time than a predetermined duration time and to type a character corresponding to the at least one first additional graphic symbol included in the key which corresponds to a symbol from the second set of keys without switching to the second page and without the user having to move their finger away from the key being held when the key is held longer than the predetermined duration time;
    determining, by the server system, at least one key selected by the user from the virtual keyboard; and
    performing, by the server system, a functionality associated with the at least one key based on the user input, wherein:
        the second page of the virtual keyboard includes one or more uncommon key symbols and a second switch key configured to switch the virtual keyboard from the second page to the first page in response to the user tapping the second switch key, and
        the one or more uncommon symbol keys on the second page of the virtual keyboard are each configured to have a second graphic symbol and at least one second additional graphic symbol, wherein the at least one second additional graphic symbol represents a key from the first set of keys of the first page, and wherein the uncommon symbol keys are tap-and-hold keys which are each configured to type a character corresponding to the second graphic symbol from the second set of keys when the key is held for less time than the predetermined duration time and to type a character corresponding to the at least one second additional graphic symbol included in the key which corresponds to a symbol from the first set of keys without switching to the first page and without the user having to move their finger away from the key being held when the key is held longer than the predetermined duration time.

2. The computer-implemented method as claimed in claim 1, wherein the first page of the virtual keyboard further comprises one or more number keys, alphabet keys, a shift key, the first switch key, a first set of bracket keys, a space bar key, a first set of coding symbols, a return key and a delete key.

3. The computer-implemented method as claimed in claim 2, wherein the second page of the virtual keyboard comprises one or more uncommon symbol keys, logical operation keys, mathematical operation keys, an indent key, a select key, the second switch key, a second set of bracket keys, the space bar key, a second set of coding symbols, the return key, the delete key, an outdent key, editing keys, a comment key and navigation keys.

4. The computer-implemented method as claimed in claim 1, wherein launching the virtual keyboard replaces a default on-screen keyboard of the device with the virtual keyboard and wherein the predetermined duration time is between 100 milliseconds and 3 seconds.

5. The computer-implemented method as claimed in claim 1, wherein the code analysis platform is further configured to track the software code in the editor platform for performing one or more functionalities comprising syntax highlighting, folding operations, and text formatting.

6. The computer-implemented method as claimed in claim 1, is further configured to enable the user to swipe across the keyboard resulting in moving a cursor in a selected direction on the editor.

7. The computer-implemented method as claimed in claim 1, is further configured to provide suggestions and/or code snippets based on predicting a context and intent of the software code.

8. The computer-implemented method as claimed in claim 1, is further configured to perform a compilation of the software code and provide errors in the software code to the user on the user device.

9. The computer-implemented method as claimed in claim 1, wherein:
    the server is configured to render a list in response to the user typing a character and/or a command using one of the keys of the virtual keyboard; and
    the list is configured to include predefined options for enabling the user to auto-complete the software code by providing an input to one of the predefined options on the list.

10. The computer-implemented method as claimed in claim 1, wherein:
the second page includes a second set of keys in which at least one of the second set of keys of the second page is configured to perform an action when the key is held for less time than the predetermined duration time,
the first page includes a second set of keys in which at least one of the second set of keys of the first page is configured to type a graphic symbol when the key is held for less time than the predetermined duration time and to perform the action performed by the at least one key of the second set of keys on the second page when the key is held for longer than the predetermined duration time.

11. The computer-implemented method as claimed in claim 10, wherein the at least one of the second set of keys of the first page is located on the virtual keyboard, relative to other keys on first page of the virtual keyboard, as a location of the at least one of the second set of keys of the second page relative to other keys of the second page of the virtual keyboard so that the action associated with the at least one key of the second set of keys on the second page can be carried out by the user by going to a same location on either the first page or the second page of the virtual keyboard.

12. The computer-implemented method as claimed in claim 11, wherein the action associated with the at least one key of the second set of keys on the second page is one of either editing text on the editor platform or navigating a cursor on the editor platform.

13. The computer-implemented method as claimed in claim 11, wherein the action associated with the at least one key of the second set of keys on the second page is one of: indentation; find; auto-complete; home; end; up; down; comment-out; undo; cut; copy; and paste.

14. A server system, comprising:
a memory configured to store instructions; and
a processor configured to execute the instructions stored in the memory and thereby cause the server system to:
receive a user input from a user through a user device for initiating a virtual keyboard for typing software code;
render the virtual keyboard for coding with a plurality of keys and at least a portion for an editor platform on a user interface of the user device, wherein the virtual keyboard includes a first page and a second page, wherein the first page comprises a first switch key configured to switch the virtual keyboard from the first page to the second page in response to the user pressing the first switch key and a first set of keys and each of the first set of keys have a first graphic symbol and at least one first additional graphic symbol, wherein the at least one first additional graphic symbol represents a key from a second set of keys of the second page, and wherein the first set of keys are tap-and-hold keys which are each configured to type a character corresponding to the first graphic symbol from the first set of keys when the key is held for less time than a predetermined duration time and to type a character corresponding to the at least one first additional graphic symbol included in the key which corresponds to a symbol from the second set of keys without switching to the second page and without the user having to move their finger away from the key being held when the key is held longer than the predetermined duration time;
determine at least one key selected by the user; and
perform a functionality associated with the key based on the user input,
wherein:
the second page of the virtual keyboard includes one or more uncommon key symbols and a second switch key configured to switch the virtual keyboard from the second page to the first page in response to the user tapping the second switch key, and
the one or more uncommon symbol keys on the second page of the virtual keyboard are each configured to have a second graphic symbol and at least one second additional graphic symbol, wherein the at least one second additional graphic symbol represents a key from the first set of keys of the first page, and wherein the uncommon symbol keys are tap-and-hold keys which are each configured to type a character corresponding to the second graphic symbol from the second set of keys when the key is held for less time than the predetermined duration time and to type a character corresponding to the at least one second additional graphic symbol included in the key which corresponds to a symbol from the first set of keys without switching to the first page and without the user having to move their finger away from the key being held when the key is held longer than the predetermined duration time.

15. The server system as claimed in claim 14, wherein the first page of the virtual keyboard further comprises one or more number keys, alphabet keys, a shift key, the first switch key, a first set of bracket keys, a space bar key, a first set of coding symbols, a return key and a delete key.

16. The server system as claimed in claim 12, wherein the second page of the virtual keyboard comprises one or more uncommon symbol keys, logical operation keys, mathematical operation keys, an indent key, a select key, the second switch key, a second set of bracket keys, the space bar key, a second set of coding symbols, the return key, the delete key, an outdent key, editing keys, a comment key and navigation keys.

17. The server system as claimed in claim 14, wherein for launching the virtual keyboard replaces a default on-screen keyboard of the device with the virtual keyboard and wherein the predetermined duration time is between 100 milliseconds and 3 seconds.

18. The server system as claimed in claim 14, wherein the processor is further configured to track the software code in the editor platform for performing one or more additional functionalities comprising syntax highlighting, folding operations, and text formatting.

19. The server system as claimed in claim 14, is further configured to enable the user to swipe across the keyboard resulting in moving a cursor in a selected direction on the editor.

20. The server system as claimed in claim 14, is further configured to provide suggestions and/or code snippets based on predicting a context and intent of the software code.

21. The server system as claimed in claim 14, is further configured to perform a compilation of the software code and provide errors in the software code to the user on the user device.

22. A system comprising:
a memory configured to store instructions;
a communication interface; and a processor in communication with the memory and the communication interface, the processor configured to execute the instructions stored in the memory and further comprising:
- a rendering module configured to render a virtual keyboard with a plurality of virtual keys for software coding as an overlay to a default on-screen keyboard, wherein the virtual keyboard includes a first page and a second page, wherein the first page comprises a first switch key configured to switch the virtual keyboard from the first page to the second page in response to a user pressing the first switch key and a first set of keys and each of the first set of keys have a first graphic symbol and at least one first additional graphic symbol, wherein the at least one first additional graphic symbol represents a key from a second set of keys of the second page, and wherein the first set of keys are tap-and-hold keys which are each configured to type a character corresponding to the first graphic symbol from the first set of keys when the key is held for less time than a predetermined duration time and to type a character corresponding to the at least one first additional graphic symbol included in the key which corresponds to a symbol from the second set of keys without switching to the second page and without the user having to move their finger away from the key being held when the key is held longer than the predetermined duration time,
- a determination module configured to determine the key selected by a user, display the graphical symbol of the key in an editor platform and perform functionality associated with the key based on user inputs on the virtual keyboard,
- a prediction module configured to provide suggestions and/or code snippets including an auto-complete feature based on predicting a context and intent of the software code, and
- an error detection module configured to compile the typed software code for generating a list of errors, wherein:
the second page of the virtual keyboard includes one or more uncommon key symbols and a second switch key configured to switch the virtual keyboard from the second page to the first page in response to the user tapping the second switch key, and
the one or more uncommon symbol keys on the second page of the virtual keyboard are each configured to have a second graphic symbol and at least one second additional graphic symbol, wherein the at least one second additional graphic symbol represents a key from the first set of keys of the first page, and wherein the uncommon symbol keys are tap-and-hold keys which are each configured to type a character corresponding to the second graphic symbol from the second set of keys when the key is held for less time than the predetermined duration time and to type a character corresponding to the at least one second additional graphic symbol included in the key which corresponds to a symbol from the first set of keys without switching to the first page and without the user having to move their finger away from the key being held when the key is held longer than the predetermined duration time.

23. The system as claimed in claim 22, wherein the error detection module is further configured to display the list of errors on a user device.

* * * * *